United States Patent [19]

Sapiejewski

[11] Patent Number: 4,644,581

[45] Date of Patent: Feb. 17, 1987

[54] HEADPHONE WITH SOUND PRESSURE SENSING MEANS

[75] Inventor: Roman Sapiejewski, Boston, Mass.

[73] Assignee: Bose Corporation, Framingham, Mass.

[21] Appl. No.: 749,575

[22] Filed: Jun. 27, 1985

[51] Int. Cl.[4] .......................... H04R 1/10; H04M 1/05; H04M 3/00

[52] U.S. Cl. .......................................... 381/74; 381/95; 381/158; 381/187; 381/183

[58] Field of Search .............................. 381/74, 95, 96; 179/156 R, 156 A, 180, 182 R

[56] References Cited

U.S. PATENT DOCUMENTS

| | | | |
|---|---|---|---|
| 2,972,018 | 2/1961 | Hawley et al. | 381/74 |
| 3,821,473 | 6/1974 | Mullins | 381/96 |
| 4,087,653 | 5/1978 | Frieder, Jr. et al. | 179/156 R |
| 4,455,675 | 6/1984 | Bose et al. | 381/74 |
| 4,598,417 | 7/1986 | Deno | 381/95 |

FOREIGN PATENT DOCUMENTS

| | | | |
|---|---|---|---|
| 3137747 | 3/1983 | Fed. Rep. of Germany | 381/96 |
| 7609200 | 2/1978 | Netherlands | 381/96 |

*Primary Examiner*—Gene Z. Rubinson
*Assistant Examiner*—Danita R. Byrd
*Attorney, Agent, or Firm*—Charles Hieken

[57] ABSTRACT

Headphones have a small cavity between the diaphragm and the ear canal with a microphone in the cavity closely adjacent to the diaphragm slightly off the axis of the ear canal and headphone diaphragm with the microphone membrane perpendicular to the headphone diaphragm. The microphone provides a feedback signal that is combined with the input electrical signal to be reproduced by the headphones to provide a combined signal that is power amplified for driving the diaphragm. The headphone transducer has a small 23 mm diameter diaphragm with a maximum excursion of 0.6 mm peak-to-peak and a low frequency resonance of 200 Hz. A disk of intracavity damping material inside the cavity isolates the microphone from the ear canal.

6 Claims, 4 Drawing Figures

HEADPHONE WITH SOUND PRESSURE SENSING MEANS

The present invention relates in general to headphoning and more particularly concerns an improvement on the headphone apparatus and techniques for reducing noise, and producing a relatively uniform frequency response that does not vary appreciably among users while reducing distortion disclosed in U.S. Pat. No. 4,455,675, incorporated herein by reference.

Both that and this invention achieve these results with relatively compact headphones that may be worn comfortably without excessive pressure on the head from forces urging the cups against the head and achieving noise reduction while faithfully reproducing a music or speech signal.

According to that invention, there are means defining a headphone cavity and electroacoustical transducing means, such as a pressure sensitive microphone, within the cavity for providing a signal corresponding to the sum of external noise and the sound produced by the headphone driver in the same cavity. That patent disclosed the microphone positioned in the cavity essentially coaxial with the headphone housing. There are means for combining this transduced signal with the input signal desired to be reproduced to produce an error signal representative of the noise and other differences between the input sound signal to be reproduced and the output of the headphone driver in the cavity. Servo means comprising the means for combining comprises means for compensating for these error signals to produce an output acoustical signal at the ear with external noise and distortion significantly reduced and with substantially uniform frequency respone between the input to which the signal desired to be reproduced is applied and the ear.

It is an important object of this invention to provide an improved headphone system embodying the basic principles of the invention disclosed in the aforesaid patent.

According to the invention, the error-sensing microphone is located close to the headphone driver diaphragm slightly off axis of the headphone driver with the microphone vibratible member perpendicular to the headphone driver diaphragm. Preferably, the headphone driver diaphragm has a small diameter of the order of 23 mm with a low resonance frequency of the order of 200 Hz and a relatively large maximum excursion, typically of the order of 0.6 mm peak-to-peak. Preferably, there is intracavity damping means comprising means for separating the ear canal and microphone. The baffle assembly is preferably located inside the headphone cup such that in rest position (off the head), the headphone cushion is inside the cushion of the noise protector separated from the cup by open cell foam and slanted so that the rear portion is further recessed than the front portion to provide a more comfortable fit with the ear that has its front portion closer to the skull than its rear portion.

Numerous other features, objects and advantages of the invention will become apparent from the following specification when read in connection with the accompanying drawing in which.

Figure 1:
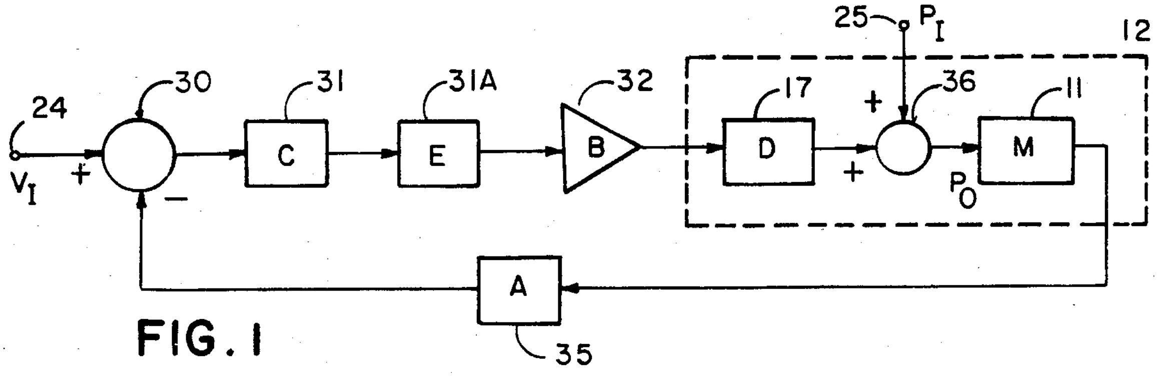
FIG. 1 is a block diagram illustrating the logical arrangement of a system embodying the invention.
Figure 2:
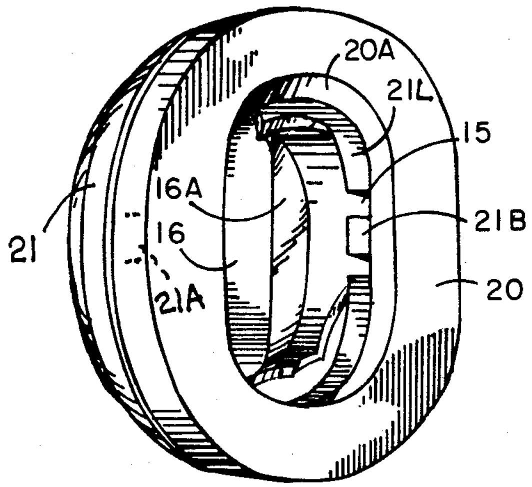
FIG. 2 is a perspective view illustrating a headphone housing assembly according to the invention.

With reference to the drawing and more particularly FIG. 1 thereof, there is shown a block diagram illustrating the logical arrangement of a system incorporating the invention corresponding substantially to FIG. 2 of the aforesaid patent. A signal combiner 30 algebraically combines the signal desired to be reproduced by the headphone on input terminal 24 with a feedback signal provided by microphone preamplier 35. Signal combiner 30 provides the combined signal to compressor 31 which limits the level of high level signals. The output of compressor 31 is applied to compensator 31A. Compensator 31A includes compensation circuits to ensure that the open loop gain meets the Nyquist stability criteria, so that the system will not oscillate when the loop is closed. The system shown is duplicated once each for the left and right ears.

Power amplifier 32 amplifies the signal from compensator 31A and energizes headphone driver 17 to provide an acoustic signal in cavity 12 that is combined with an outside noise signal that enters cavity 12 from a region represented as acoustic input terminal 25 to produce a combined acoustic pressure signal in cavity 12 represented as a circle 36 to provide a combined acoustic pressure signal applied to and transduced by microphone 11. Microphone preamplifier 35 amplifies the transduced signal and delivers it to signal combiner 30.

Figure 4:
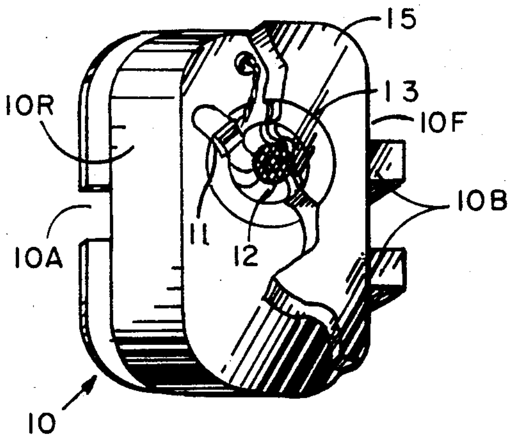
FIG. 4 is a perspective view of the headphone assembly with a portion of intracavity damping material cut away to illustrate the off axis location of the microphone.

Referring to FIGS. 2 and 4, there is shown a perspective view of an improved headphone assembly according to the invention including a conventional noise reducer having an outer ear surround cushion 20 adjacent to headphone cup 21. Outer ear surround cushion 20 is formed with an oval opening 20A that exposes baffle assembly 10. Baffle assembly 10 is mounted with its main plane at a slight angle to that of inner surround cushion 15 so that the rear edge 10R of baffle assembly 10 is recessed deeper than its front edge 10F. This tilt helps provide a comfortable fit with the outer ear that diverges outward from the skull from front to rear. The open cell foam stepped pad 16 mechanically isolates baffle assembly 10 from cup 21. The step 16A helps maintain the desired tilt. Tabs 10B sandwich front central cup brace 21B inside of lip 21L while recess 10A engages the rear central cup brace 21A to establish the tilted rest position.

Figure 3:
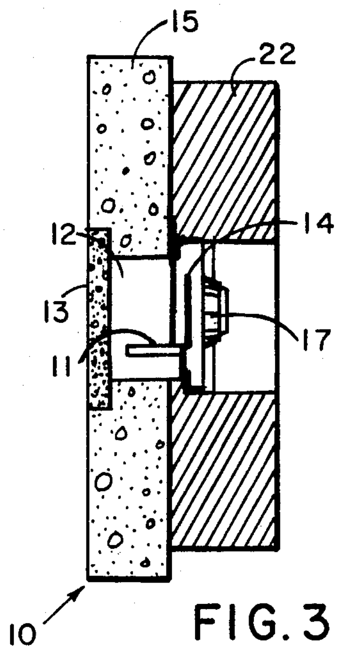
FIG. 3 is a sectional view through a vertical section of the assembly showing elements arranged according to the invention.

Referring to FIG. 3, there is shown a sectional view of baffle assembly 10 through an axial vertical section. Headphone transducer 17 is seated in an opening in baffle 22 to seal the end of acoustic cavity 12 away from the ear. Acoustic cavity 12 accommodates microphone 11 adjacent to diaphragm 14 of headphone transducer 17. Diaphragm 14 and acoustic cavity 12 have a common axis. Microphone 11 has a vibratible membrane displaced from the common axis with its plane generally parallel to the common axis and generally perpendicular to the plane of headphone transducer diaphragm 14. Intracavity damping material 13 is located at the end of acoustic cavity 12 adjacent to the ear. Inner surround cushion 15 surrounding acoustic cavity 12 is also made of damping material. FIG. 4 shows a perspective view of baffle assembly 10 with a portion of intracavity damping material 13 removed to expose how microphone 11 is seated in acoustic cavity 12 displaced from the common axis.

The structural arrangement described has a number of advantages. The close location of microphone 11 to diaphragm 14 and the perpendicular orientation of its membrane to that of headphone transducer diaphragm 14 results in increased bandwidth of the servo loop. Placing microphone 11 off the axis of headphone transducer 17 and cavity 12 reduces peaks in frequency response at the high end, and the small microphone support 11A reduces the effect of diffraction, allowing microphone 11 to sense sound pressure of amplitude very close to that existing at the entrance of the ear canal.

The small diameter of headphone transducer diaphragm 14, typically 23 mm in diameter, allows for increase of the bandwidth of the servo loop. The low resonant frequency of headphone transducer 17, typically 200 Hz, results in higher output level at low frequencies, and the large maximum excursion of diaphragm 14, typically 0.6 mm peak-to-peak, allows creation of high sound pressure levels inside cavity 12. In a specific embodiment a driver from SONY MDR30 headphones provide sound pressure levels in the cavity of 125 db at 300 Hz and 115 db at 20 Hz.

The intracavity damping material 13 made of thin open cell foam, such as urethane of one pound/$ft^3$ density 3 mm thick, separates the ear and microphone 11, damping high frequency resonances and protecting microphone 11 and headphone driver 17 without introducing a pressure gradient between the ear canal entrance and the microphone in the servo-controlled noise reduction band.

Baffle assembly 10 is located inside headphone cup 21 such that in rest position (off the lead), inner surround cushion 15 is inside the outer ear surround cushion 20 of the noise protector and is spaced from headphone cup 21 by open cell foam pad 16. Slanted orientation of the head-phone assembly of FIG. 2 provides better seal to the earlobe with less discomfort. The inner face foam pad 16 provides floating support for better placement of the headphone on the ear and improvement in passive noise attenuation while applying enough pressure to maintain good acoustic contact with the ear.

There has been described novel apparatus and techniques for effecting a marked improvement in the invention of the aforesaid patent. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. In a headphone apparatus comprising driver means for converting an input electrical signal into an acoustical output signal, said driver means having a vibratible diaphragm on one side thereof, headphone cup means, cushion means having a central opening defining an acoustic cavity, said cushion means and said diaphragm having a common axis, said cushion means, when mounted at a user's outer ear, forming a seal which inhibits air flow between said acoustic cavity and a region outside said headphone apparatus to attenuate spectral components through the middle frequency range, a baffle for supporting said driver means, an electroacoustical transducing means separate from said driver means for transducing an acoustical pressure signal in said acoustic cavity to a corresponding transduced electrical signal, said electroacoustical transducing means being adjacent to said diaphragm on a side opposite the driver means but sufficiently close to the acoustic cavity so that said transducing means is responsive to the pressure in said acoustic cavity near the ear, the improvement comprising, said electroacoustical transducing means being displaced from said common axis in a plane generally parallel to said common axis and generally perpendicular to the plane of the driver means vibratible diaphragm.

2. Headphone apparatus in accordance with claim 1 and further comprising, intracavity damping material in said acoustic cavity on a side of said electroacoustical transducing means opposite the diaphragm.

3. Headphone apparatus in accordance with claim 1 wherein said driver means vibratible diaphragm has a diameter of the order of 23 mm, said driver means has a resonance of the order of 200 Hz, and said vibratible diaphragm has a maximum excursion of the order of 0.6 mm.

4. Headphone apparatus in accordance with claim 2 wherein said driver means vibratible diaphragm has a diameter of the order of 23 mm, said driver means has a resonance of the order of 200 Hz, and said vibratible diaphragm has a maximum excursion of the order of 0.6 mm.

5. Headphone apparatus in accordance with claim 1 wherein said headphone cup means has an open side, said cushion means comprises an inner surround cushion and an outer ear surround cushion, said inner surround cushion spaced from the headphone cup means by open cell foam means, said outer ear surround cushion mounted on the open side of the headphone cup means, and said inner surround cushion being mounted inside the headphone cup means adjacent the outer ear surround cushion;

wherein said baffle, said driver means, said electroacoustical transducing means and said inner surround cushion comprise a baffle assembly having a front and a rear;

an inner face of said open cell foam means comprising means for providing floating support for the baffle assembly, said open cell foam means further applying pressure to the baffle assembly such that the baffle assembly maintains good acoustic contact with the ear.

6. Headphone apparatus in accordance with claim 5 further comprising slanted means for mounting said baffle assembly in said headphone cup means so that the front of said baffle assembly is closer to the head than the rear of said baffle assembly.

* * * * *